United States Patent
Friederich et al.

(10) Patent No.: US 6,903,915 B2
(45) Date of Patent: Jun. 7, 2005

(54) VARIABLE CAPACITOR VOLTAGE-CONTROLLABLE BY USE OF COULOMB BLOCKING PHENOMENON

(75) Inventors: Alain Friederich, Paris (FR); Frédérich Nguyen Van Dau, Palaiseau (FR); Albert Fert, Paris (FR); Henri Jaffres, Orsay (FR)

(73) Assignee: Thales, Paris (FR)

( * ) Notice: Subject to any disclaimer, the term of this patent is extended or adjusted under 35 U.S.C. 154(b) by 66 days.

(21) Appl. No.: 10/416,893
(22) PCT Filed: Nov. 13, 2001
(86) PCT No.: PCT/FR01/03546
§ 371 (c)(1), (2), (4) Date: May 16, 2003
(87) PCT Pub. No.: WO02/41341
PCT Pub. Date: May 23, 2002

(65) Prior Publication Data
US 2004/0047110 A1 Mar. 11, 2004

(30) Foreign Application Priority Data
Nov. 17, 2000 (FR) .............................................. 00 14884

(51) Int. Cl.⁷ ................................................. H01G 7/00
(52) U.S. Cl. ........................ 361/277; 361/272; 361/278; 361/280; 361/283.4; 361/293
(58) Field of Search ................................. 361/277, 278, 361/279, 280, 281, 283.3, 283.4, 293, 296, 271, 272, 273, 295, 275

(56) References Cited

U.S. PATENT DOCUMENTS

| | | | | |
|---|---|---|---|---|
| 3,829,881 | A | * | 8/1974 | Kohashi ....................... 257/42 |
| 4,720,767 | A | * | 1/1988 | Chan et al. .............. 361/275.4 |
| 4,983,570 | A | | 1/1991 | Creuzet et al. |
| 5,093,753 | A | | 3/1992 | Friederich et al. |
| 5,134,533 | A | | 7/1992 | Friedrich et al. |
| 5,141,894 | A | | 8/1992 | Bisaro et al. |
| 5,239,187 | A | | 8/1993 | Schuhl et al. |
| 5,313,058 | A | | 5/1994 | Friederich et al. |
| 5,686,879 | A | | 11/1997 | Schuhl et al. |
| 6,191,581 | B1 | | 2/2001 | Van Dau et al. |
| 6,291,993 | B1 | | 9/2001 | Fert et al. |
| 6,496,004 | B1 | | 12/2002 | Nguyen Van Dau et al. |

FOREIGN PATENT DOCUMENTS

DE  30 12 117 A  10/1981

OTHER PUBLICATIONS

K.P. Hirvi; "Arrays of Normal Metal Tunnel Junctions in Weak Coulomb Blockade Regime" Applied Physics Letters, American Institute of Physics, New York, USA, vol. 67, No. 14; Oct. 2, 1995; pp. 2096–2098, XP002040335.

* cited by examiner

Primary Examiner—Anthony Dinkins
Assistant Examiner—Nguyen T. Ha
(74) Attorney, Agent, or Firm—Lowe Hauptman Gilman & Berner, LLP

(57) ABSTRACT

Variable capacitive device, such as a capacitor, controllable in voltage Vc including at least one first armature (L) and one second armature (R), the armatures being separated by an insulation layer (D) including several conducting aggregates separated from each other. The use of the capacitor according to the invention in a resonant circuit.

17 Claims, 4 Drawing Sheets

VARIABLE CAPACITOR VOLTAGE-CONTROLLABLE BY USE OF COULOMB BLOCKING PHENOMENON

CROSS-REFERENCES TO RELATED APPLICATIONS

The present Application related to the International Application No. PCT/FR01/03546, filed on Nov. 13, 2001, entitled "Variable Capacitance Voltage-Controllable By Use of Coulomb Barrier Phenomenon", which in turn corresponds to FR 00/14884 filed on Nov. 17, 2000, and priority is hereby claimed under 35 USC §119 and 35 USC §120 based on these applications.

BACKGROUND OF THE INVENTION

1. Field of the Invention

This invention relates to a capacitive device such as a variable capacitor controlled using the <<Coulomb blocking>> phenomenon.

The Coulomb blocking phenomenon occurs in conducting or semi-conducting aggregates on which electrical charges can be accumulated, when isolated from their environment and slightly coupled to it due to the tunnel effect. In particular, this phenomenon characterizes some metal-insulator-metal junctions composed of two metallic armatures L, R separated by a dielectric matrix D in which small metallic particles or aggregates, typically with a size of a few nanometers, are dispersed. FIG. 1 diagraminatically shows a cross-section through such a structure. Coulomb blocking can be seen firstly by zero conductance between the two armatures L, R, or electrodes, below a voltage threshold Vs. It simply represents the electrostatic energy to be overcome to make an electron transit through a central aggregate and consequently to circulate a current from one armature to the other.

The curve in FIG. 2 shows the charge N accepted by an aggregate for a given voltage, as a function of the threshold voltage Vs applied at the armatures of the capacitor. For a given energy threshold, the charge of the aggregate is incremented by one unit from Ne to (N+1)e, which can be seen on the I(V) characteristic of the tunnel junction by a series of constant parts and steps, the steps corresponding to voltages at uniform intervals in units of Vs.

These blocking effects are very well described at low temperature, but have to be weighted by the thermal activation energy (kT=25 meV at 300 K) for devices operating at ambient temperature.

2. Description of the Related Art

Prior art divulges capacitors with variable semi-conductor type control, that have the disadvantage of relatively large leakage resistances. These leakage resistances may be harmful to smooth operation of the capacitor, and for example the quality factor may be degraded.

The purpose of the invention is a capacitive device such as a voltage controlled variable capacitor, for example using a DC voltage.

The concept is to be able to control the quantity of charges stored on aggregates and on each armature in the capacitor, by means of a potential difference. The capacitor may be considered as the ratio between the quantity of charges stored on the armatures and the voltage that can be modulated as a result.

BRIEF SUMMARY OF THE INVENTION

The purpose of the invention relates to a variable capacitor device controllable in voltage Vc comprising at least one first armature L and a second armature R. It is characterized in that the said armatures are separated by an isolating layer comprising a number of conducting aggregates separated from each other.

According to one embodiment, the armatures L and R may be for example be separated by a distance d and the distance $d_L$ from one aggregate to a first armature, for example the closest, is such that $1<(d_L/d_R)<10$ where $d=d_L+d_R$, and $d_R$ is the distance from one aggregate to the second armature.

Aggregates may be distributed in one or several two-dimensional planes at regular intervals and the distance $d_L$ from one aggregate in the plane closest to an armature is such that $1<(d_L/d_R)<10$ where $d=d_L+d_R$.

For example, the insulation may be formed from at least two dielectrics with different nature and the aggregates are distributed at the interface separating two adjacent dielectrics.

The insulation composed of two materials $D_R$ and $D_L$ with dielectric constants $\varepsilon_R$ and $\varepsilon_L$, with the value of the $\varepsilon_R/\varepsilon_L$ ratio being chosen for example as a function of the threshold voltage, the threshold voltage preferably being equal to a value of the order of a few hundred millivolts or of the order of one volt.

The insulation may be alumina or a dielectric chosen from among $SiO_2$, $TiO_2$, $Si_3N_4$, $Al_2O_3$, AlN, BN, MgO, $Ta_2O_5$, alone or in combination.

The invention also relates to a resonant circuit comprising at least one capacitor comprising at least two armatures (L) and (R) separated by dielectric (D) comprising a number of aggregates that can be charged or discharged under the effect of a control voltage (Vc) output by a generator.

For example, the control voltage to be applied may be a DC voltage.

According to one embodiment, the value of the control voltage is chosen to give a variation in the relative capacitance equal to:

$$\frac{\Delta C}{C_{L,R}^0} = \frac{2}{(2N+1)} \frac{\varepsilon_R}{\varepsilon_L} \frac{d_L}{d_R} \rho(s_c) N_{IS} s_c^2$$

where $$s_c = \frac{(2N+1)ed_R}{2\varepsilon_R V_c}$$

and in which $N_i$ is the average quantity of charge carried by the aggregates, $N_{IS}$ is the density of aggregates per unit area, $S_c$ is the average area of aggregates, p is the normal distribution of the size of aggregates.

In particular, the invention has the advantage that it offers a capacitive device in which the capacitor may be voltage controlled, and therefore adapted to a required operating range.

BRIEF DESCRIPTION OF THE DRAWINGS

Other characteristics and advantages will become clear when reading the following description of an embodiment of a capacitor used as a non-limitative example illustrated in the attached drawings in which.

DETAILED DESCRIPTION OF THE INVENTION

Figure 1:
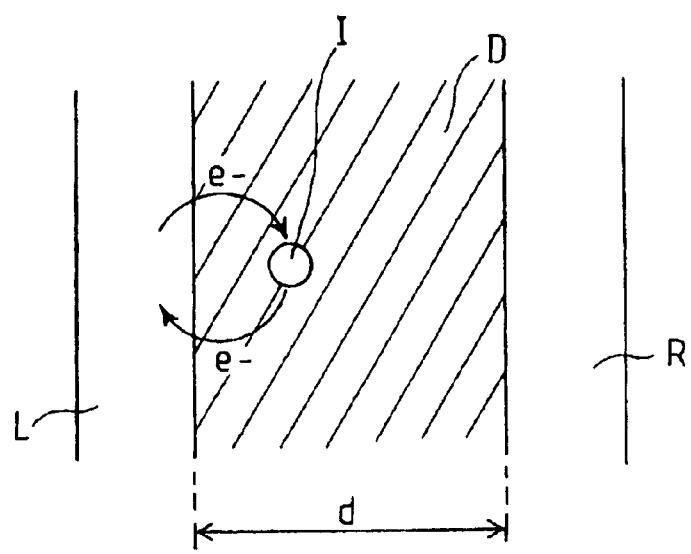
FIG. 1 is a diagrammatic section through a capacitor according to the invention, FIG. 2 diagrammatically shows the various charges accepted by an aggregate as a function of the threshold voltage.
Figure 2:
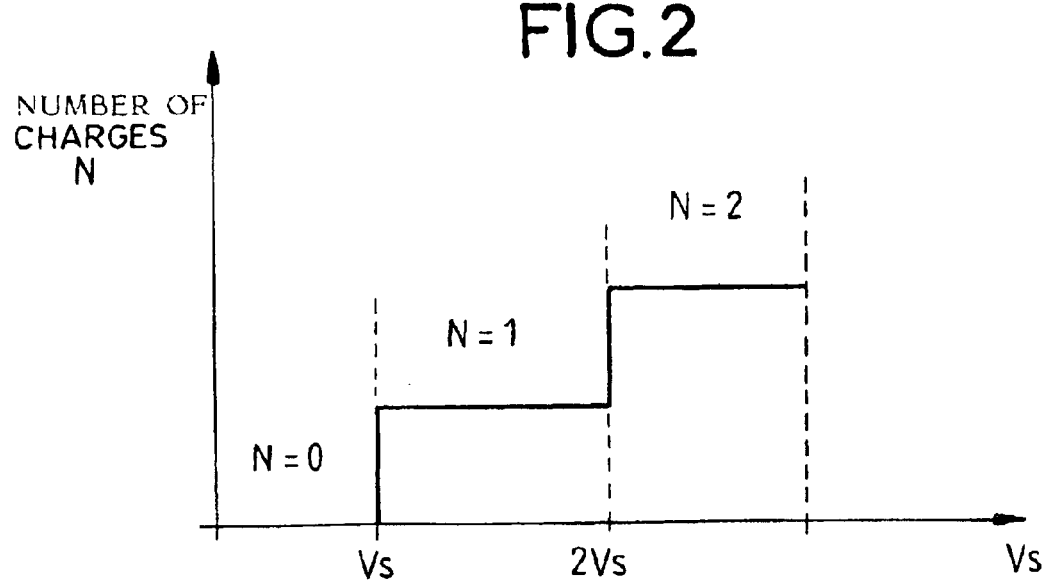

The capacitive device in FIG. 1 comprises a capacitor structure according to the invention. The structure of this capacitor comprises a first metallic armature L and a second metallic armature R, separated by an insulation layer D or a dielectric with thickness d.

The dielectric D includes several conducting aggregates I insulated from each other. For example, these aggregates may be made of metal or semi-conducting material and form sites on which carrier charges, for example electrons, can be accumulated. The charge of an aggregate depends on its electrostatic potential Vs. This charge may vary by the application of a control voltage (FIG. 3).

The aggregate size is chosen to be sufficiently small, of the order of a few nm (nanometers) such that the thermal activation term remains much lower than the threshold energy, such that Coulomb blocking can be observed at ambient temperature, and possibly at higher temperatures.

Aggregates distributed in the dielectric have a certain diversity in size. The use of monodispersed aggregates means that there is no capacitance modulation. The size dispersion of the aggregates is characterized by a given width $I_a$, for example measured at mid-height of the distribution curve.

Figure 3:
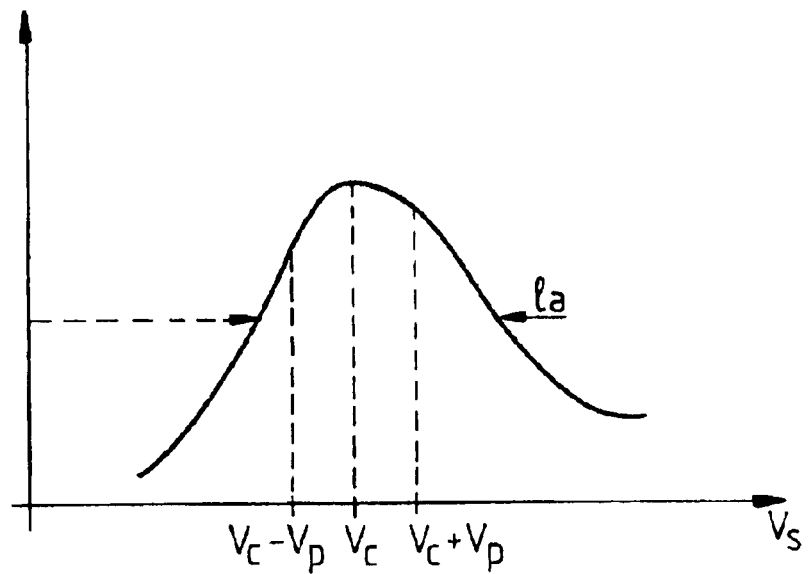
FIG. 3 is a curve indicating the distribution of <<activated>> aggregates or aggregates that participate as a function of the threshold voltage.

FIG. 3 shows a normalized aggregate distribution curve as a function of the value of the threshold voltage Vs. Aggregates are charged and discharged around this value Vs, within a voltage range corresponding to [−Vp+Vc, Vc+Vp], during one period of a sinusoidal signal with amplitude Vp, the sinusoidal signal being an external signal applied to the capacitor.

For example, the aggregates may be uniformly distributed in the dielectric with a three-dimensional structure.

Figure 5:
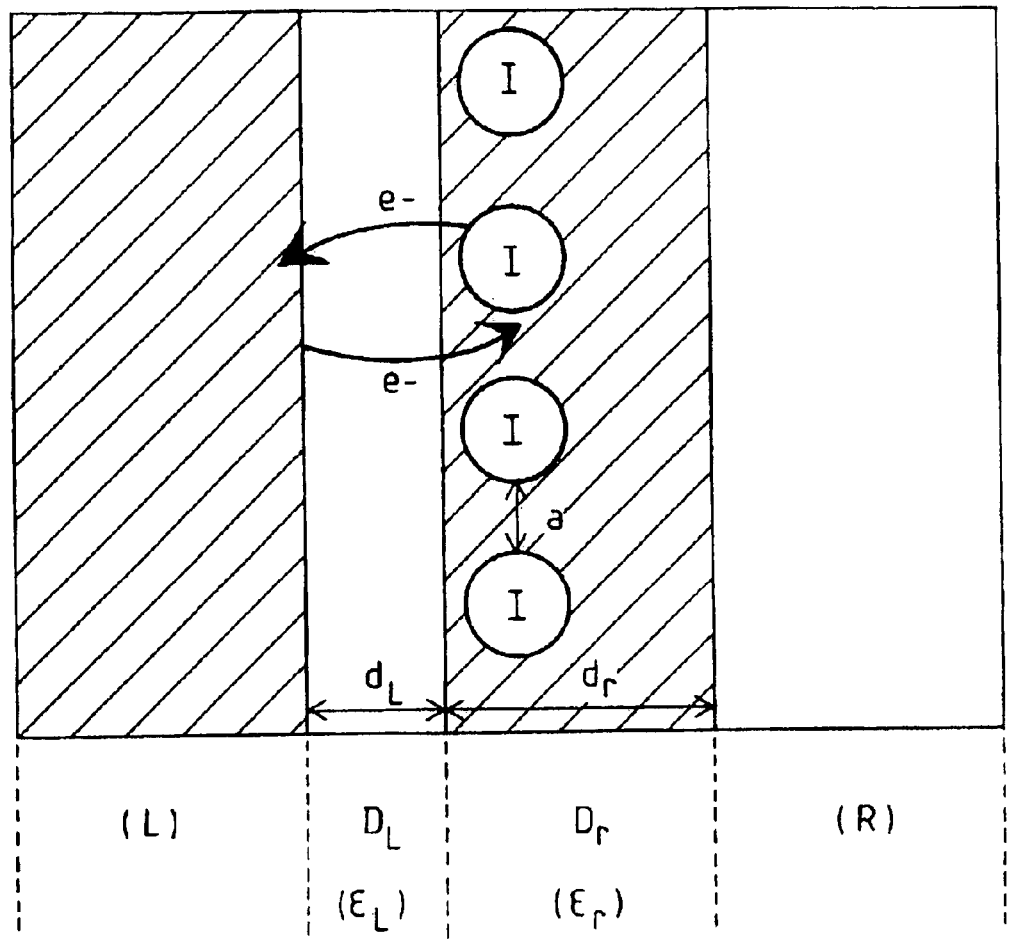
Figure 6:
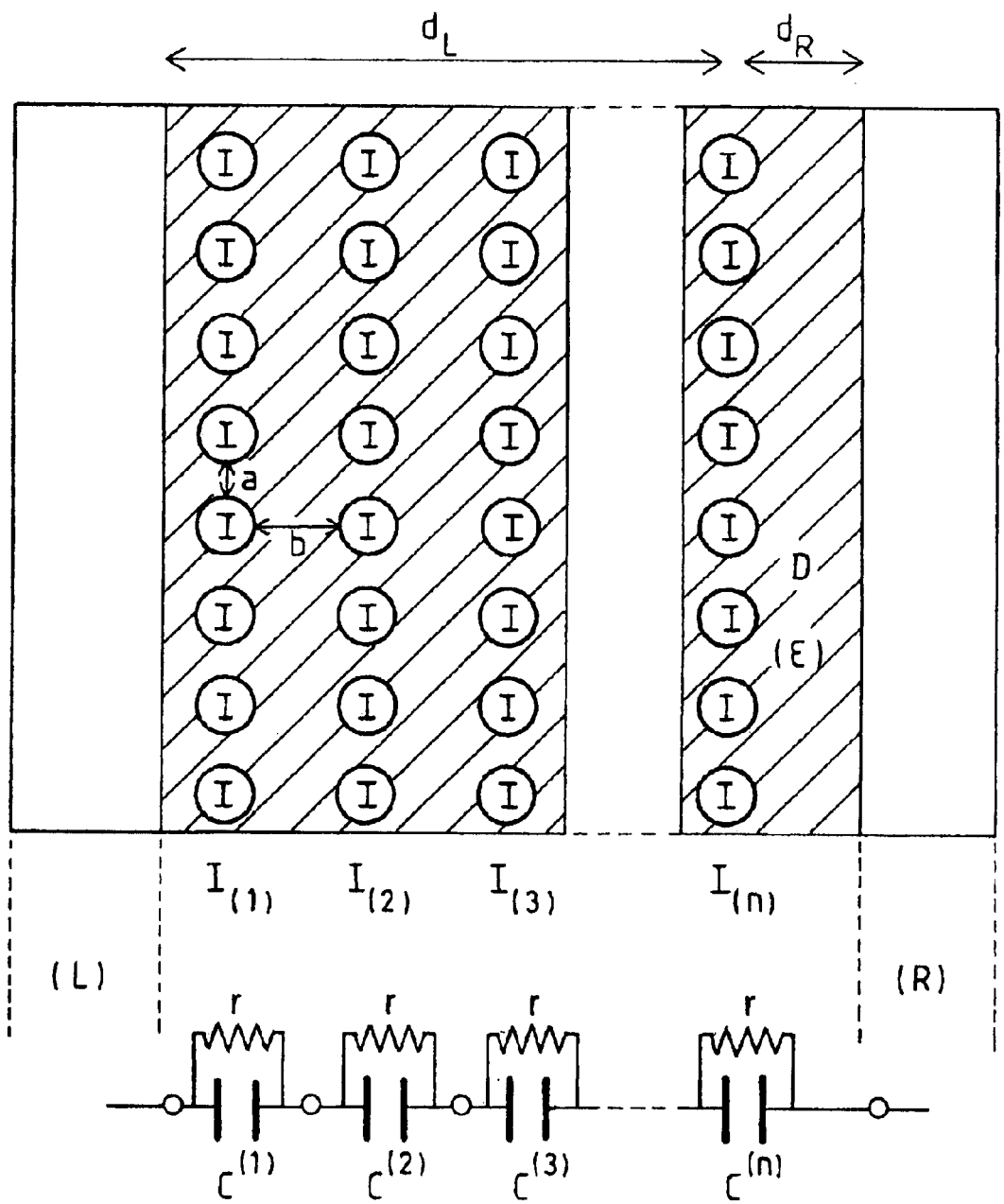

Without going outside the framework of the invention, the aggregates may also be distributed in two-dimensional planes according to the layouts shown in FIGS. 5 and 6.

Figure 4:
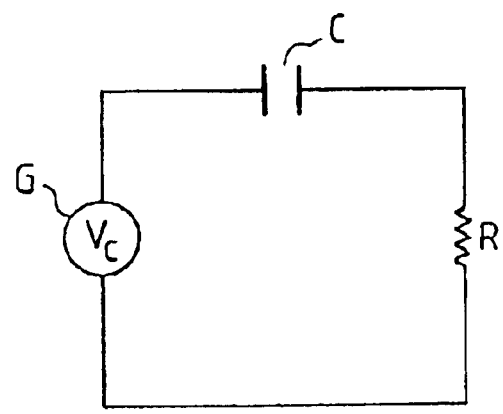
FIG. 4 is an example of a diagram of a resonant circuit using a capacitor according to the invention, FIGS. 5 and 6 diagrammatically show a section through two alternative embodiments of a capacitor structure containing aggregates distributed on one or several two-dimensional planes and their equivalent electrical schematic.

FIG. 4 shows a resonant circuit, for example comprising a resistance R, a capacitor C according to the invention, connected to a generator G capable of outputting a DC voltage Vc. This control voltage Vc is superposed on the sinusoidal modulation Vp. The voltage Vc in particular determines the number of aggregates participating in variation of capacitor C.

Without going outside the framework of the invention, the capacitor with one of the characteristics according to the invention may be integrated into a terminator circuit comprising an inductance in parallel with the capacitor, or other more complex resonant circuits known to a person skilled in the art.

The following description describes the variation or modulation of the capacitor as the function of the control voltage applied at its terminals. It is given for a capacitor structure described in FIG. 5 for illustrative purpose and that is in no way limitative.

FIG. 5 diagrammatically shows a capacitor in which the dielectric D is composed of two materials with different dielectric constants, $\in_L$ and $\in_R$ respectively. For example, the aggregates are separated by a distance <<a>> and are distributed according to a two-dimensional plane, for example at the boundary of the two dielectrics and at a distance $d_L$ from the armature (L) and $d_R$ from the armature (R). These aggregates have an electrostatic influence on these two armatures. In this case, considering the transfer of electrons between the left armature (L) and an aggregate I, the threshold voltage Vs corresponding to the energy to be supplied to add an additional charge as far as the surface of an aggregate is given by the following relation $$V_s = V_{L/I} + V_{I/R} = \frac{2N+1}{2} \frac{C_{R/I} + C_{L/I}}{C_{R/I}} \frac{e}{c_{R/I} + c_{L/I}} \quad [1]$$

where $V_{L/I}$=the voltage between the aggregate and the left armature, $V_{I/R}$ is the voltage between the aggregate and the right armature, $C_{R/I}$ and $C_{L/I}$ are the mutual capacitances between the aggregates and the aggregates plane seen as a whole, and $c_{R/I}$ and $c_{L/I}$ are the capacitances of a single aggregate with one of the armatures R or L respectively.

Determination of the total capacitance between the two armatures in the presence of charges stored on the aggregates The quantity of charge stored in each armature L and R, when there is a charge $Q_I$ stored on a central aggregate, for example originating from armature L, is given by the relation between $Q_L$, $Q_R$ and $Q_I$.

$$Q_R = \frac{C_{L,I} C_{R,I}}{C_{L,I} + C_{R,I}} V - Q_I \frac{C_{R,I}}{C_{L,I} + C_{R,I}} \quad [2]$$

where V is the voltage applied to the terminals of the two armatures,

If the electron transfer takes place only between the left armature and the aggregates, the capacitance is written as follows taking account of Coulomb blocking effects, $$C = \frac{C_{L,I} C_{R,I}}{C_{L,I} + C_{R,I}} - \frac{C_{R,I}}{C_{L,I} + C_{R,I}} \frac{\delta Q_I}{\delta V} \quad [3]$$

in other words $$C = \frac{C_{L,I} C_{R,I}}{C_{L,I} + C_{R,I}} \left(1 - \frac{e}{C_{L,I}} \frac{\delta N_I}{\delta V}\right) \quad [4]$$

where $N_I$, is the number of charged aggregates

According to relation [4], the relative variation of the capacitance is equal to $$\frac{\Delta C}{C_{L,R}^0} = \frac{|e|}{C_{L,I}} \frac{\delta N_I}{\delta V}(V_c) \quad [5]$$

where $C^O_{L,R}$ is the value of the capacitance between the armatures if there are no aggregates in the dielectric.

Therefore the variation of the capacitance depends on the number of charged aggregates that can vary by applying a continuous voltage exceeding the threshold voltage.

Variable Voltage Capacitor

Mutual capacitances between the aggregate plane seen as a whole and the armatures (L) and (R) respectively are written as follows, as a first approximation:

$$C_{L/I} = \varepsilon_L \frac{S}{d_L} \text{ and } C_{R/I} = \varepsilon_R \frac{S}{d_R}$$

where S is the surface area of the armature, and assuming that the two armatures L and R have identical surface areas.

The mutual capacitances between the armatures and a given particle $C_{I/L}$ and $C_{R/I}$ are obtained by replacing the total surface area S by the effective area of the particle facing the armature considered.

Considering relation [1], the threshold voltage $v_s$, may for example be expressed as a function of the area of the particle s $$V_s = \frac{2N+1}{2} \frac{e}{\varepsilon_R} \frac{d_R}{s} \quad [6]$$

therefore, at a given control voltage Vc, there is a corresponding area of aggregates for which the charge can change:

$$s_c = \frac{2N+1}{2} \frac{e}{\varepsilon_R} \frac{d_R}{V_c} \quad [7]$$

where $d_R$ is the distance from the aggregate to the armature R at the right of the diagram, N is the initial charge for an aggregate and a given voltage Vc.

Within the voltage interval [Vc−Vp; Vc+Vp], the junctions that are charged and discharged successively within one period of modulation signal Vp are the junctions for which the area $s_c$ of the particle is between $$s_c = \frac{(2N+1)ed_R}{2\varepsilon_R V_c} \text{ and } s_c = \frac{(2N+1)ed_R}{2\varepsilon_R (V_c+V_p)} \quad [8]$$

which corresponds to a range of aggregate surface areas $\Delta s_c$ equal to:

$$\Delta s_c = \frac{(2N+1)ed_R v_p}{2\varepsilon_R V_c^2} \quad [9]$$

If p(s) is the normalised distribution of aggregates with area s, the number of particles for which the area is between s and s+Δs is equal to:

$$N_{IS} S p(s) \Delta s \quad [10]$$

where $N_{IS}$ is the number of aggregates per unit area and S is the total area of the capacitor.

The number of aggregates that are charged is then equal to:

$$N_l = \frac{2N_{IS} S \rho(s) v_p \varepsilon_R s_c^2}{(2N+1)ed_R} \quad [11]$$

And the relative variation of the capacitance is expressed using the following relation:

$$\frac{\Delta C}{C_{L,R}^0} = \frac{2}{(2N+1)} \frac{\varepsilon_R}{\varepsilon_L} \frac{d_L}{d_R} \rho(s_c) N_{IS} s_c^2 \quad [12]$$

where $$s_c = \frac{(2N+1)ed_R}{2\varepsilon_R V_c} \quad [13]$$

Relations [12] and [13] express the variation of the capacitance as a function of the control voltage Vc, the density of the aggregates and their size dispersion. The modulation of the capacitance depends on the apparent coverage rate, $N_{IS}*s_c$, and the distribution value p(s) used for s=$s_c$.

Characteristic Parameters of the Capacitor

The three main characteristics of variable capacitors are their modulation amplitude, their control voltage scale corresponding to the preferred voltage range (in which it is required to work), and their leakage resistance.

Some parameters can be chosen to optimise these various characteristics, and particularly the nature and geometry of the dielectric D, and the dispersion width in aggregate size.

Thickness of the Dielectric Located Between Two Armatures

The distance $d_R$ separating an aggregate from the right armature of the capacitor is chosen to be as large as possible to prevent or minimize leakage currents due to the tunnel effect.

Preferably, the value of the $d_R/d_L$ ratio is in the interval [1, 10]. In particularly, this range of values limits the leakage current through the capacitor and therefore improves the quality factor and the pass band of an electronic circuit using capacitors.

Dielectric Constants

For a dielectric formed of several dielectric materials with different values of the dielectric constant, the amplitude of the modulation of a capacitor varies linearly as the ratio between the values of dielectric constants.

For example, making a barrier formed of two materials for which the ratio of the dielectric constants is chosen suitably, for example $\varepsilon_R/\varepsilon_L$ greater than one, is a means of artificially increasing the electrostatic potential of aggregates for a fixed control voltage. This property creates a corresponding increase in the observed modulation, with respect to the dielectric constants. At the same time, this effect is accompanied by a reduction in the modulation voltage and their variation range.

In the case of alumina for which the value of the dielectric constant is 8, and for aggregate sizes of the order of one nanometer and a distance $d_L$ close to 1 nm, the values of the threshold voltages obtained are of the order of a few hundred mV or one volt.

Choice of the Dielectric Materials

The dielectric consisting of one or several insulating materials may be chosen from among $SiO_2$, $TiO_2$, $Si_3N_4$, $Al_2O_3$, AlN, BN, MgO, $Ta_2O_5$ used alone or in combination.

Width of the Aggregate Size Dispersion

Relations [12] and [8] show that the modulation amplitude of the capacitor is inversely proportional to the dispersion width, whereas the voltage range on which the modulation operates increases with the dispersion width. In general, the width of the appropriate size distribution is chosen to maximize the modulation amplitude while maintaining an accessible control voltage range.

If the size dispersion of the aggregates is not very wide, the observed capacitance modulation is described by a function with a shape similar to distribution.

In particularly, reducing the barrier thickness $d_L$ or using an insulator (L) with a low barrier height is a means of not limiting the frequency response of the variable capacitor, since the frequency response is determined by the transit time of an electron from the left armature to the aggregates.

FIG. 6 diagrammatically shows a section through a capacitor comprising aggregates $I_{(i)}$ distributed on several equidistant planes (distance b) and its associated electrical diagram, and the equivalent circuit.

This type of structure may be used to increase the modulation effect in proportion to the number of aggregates present in the dielectric. However, this effect must be weighted by the voltage drop that takes place between two successive aggregate planes. For example, this property is used to increase the control voltage range to the detriment of a significant increase in the modulation.

More generally, a judicious choice of the distances between planes, the dielectric constants and the density of aggregates, can increase either the modulation amplitude or the voltage scale on which this variation is applied.

What is claimed is:

1. The variable capacitive device controllable by voltage Vc comprising at least one first armature (L) and one second armature (R), wherein the said armatures are separated by an insulation layer (D) including several conducting aggregates separated from each other.

2. The capacitive device according to claim 1, wherein the armatures (L) and (R) are separated by a distance d and in that the distance $d_L$ from an aggregate to an armature (the closest) is such that $1<(d_L/d_R)<10$ where $d=d_L+d_R$.

3. The capacitive device according to claim 1, wherein the aggregates are distributed in a two-dimensional plane.

4. The capacitive device according to claim 1, wherein the aggregates are distributed in several two-dimensional planes at periodic intervals and in that the distance dL from an aggregate in the plane closest to a first armature (L) is such that 1<(dL/dR) <10 where d=dL+dR, and where dR is the distance from one aggregate to the second armature.

5. The capacitive device according to claim 1, wherein the insulation is formed from at least two dielectrics of different natures and in that the aggregates are distributed at the interface separating two adjacent dielectrics.

6. The capacitive device according to claim 1, wherein the insulation is composed of two materials DR and DL, each with a dielectric constant ∈R and ∈L, the value of the ∈R/∈L ratio being chosen with respect to the threshold voltage, the threshold voltage preferably being of the order of a few hundred millivolts or one volt.

7. The captive device according to claim 1, wherein the insulation is alumina or a dielectric chosen from among SiO2, TiO2, Si3N4, Al2O3, AlNBN, MgO, Ta2O5, alone or in combination.

8. A resonant circuit with a capacitor comprising two armatures (L) and (R) separated by a dielectric (D) comprising a number of aggregates that can be charged or discharged under the effect of a control voltage (Vc) output by an adapted device (G).

9. The circuit according to claim 8, wherein in that the control voltage to be applied is a DC voltage.

10. The circuit according to claim 8, wherein the control voltage is chosen to obtain a relative variation in the capacitance $$\frac{\Delta C}{C_{L,R}^0} = \frac{2}{(2N+1)} \frac{\varepsilon_R}{\varepsilon_L} \frac{d_L}{d_R} \rho(s_c) N_{IS} s_c^2$$

where $$s_c = \frac{(2N+1)ed_R}{2\varepsilon_R V_c}$$

where N is the average quantity of charge carried by the aggregates, $N_{IS}$ is the density of aggregates per unit area, $S_c$ is the average area of the aggregates and p is the normalised distribution of the aggregate size.

11. The circuit according to claim 8, with a capacitor comprising two armatures (L) and (R) separated by a dielectric (D) comprising a number of aggregates that can be charged or discharged under the effect of a control voltage (Vc) output by an adapted device (G).

12. The circuit according to claim 8, wherein the armatures (L) and (R) are separated by a distance d and in that the distance $d_L$ from an aggregate to an armature (the closest) is such that $1<(d_L/d_R)<10$ where $d=d_L+d_R$.

13. The circuit according to claim 8, wherein the aggregates are distributed in a two-dimensional plane.

14. The circuit according to claim 8, wherein the aggregates are distributed in several two-dimensional planes at periodic intervals and in that the distance $d_L$ from an aggregate in the plane closest to a first armature (L) is such that $1<(d_L/d_R)<10$ where $d=d_L+d_R$, and where $d_R$ is the distance from one aggregate to the second armature.

15. The circuit according to claim 8, wherein the insulation is formed from at least two dielectrics of different natures and in that the aggregates are distributed at the interface separating two adjacent dielectrics.

16. The circuit according to claim 8, wherein the insulation is composed of two materials $D_R$ and $D_L$, each with a dielectric constant $\in_R$ and $\in_L$, the value of the $\in_R/\in_L$ ratio being chosen with respect to the threshold voltage, the threshold voltage preferably being of the order of a few hundred millivolts or one volt.

17. The circuit according to claim 8, wherein the insulation is alumina or a dielectric chosen from among $SiO_2$, $TiO_2$, $Si_3N_4$, $Al_2O_3$, AlNBN, MgO, $Ta_2O_5$, alone or in combination.

* * * * *